US012012119B2

(12) United States Patent
Suenaga (10) Patent No.: US 12,012,119 B2
(45) Date of Patent: Jun. 18, 2024

(54) CONTROL DEVICE FOR MOBILE BODY

(71) Applicant: Mazda Motor Corporation, Hiroshima (JP)

(72) Inventor: Shuji Suenaga, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 329 days.

(21) Appl. No.: 17/617,309

(22) PCT Filed: Mar. 16, 2020

(86) PCT No.: PCT/JP2020/011366
§ 371 (c)(1),
(2) Date: Dec. 8, 2021

(87) PCT Pub. No.: WO2020/250524
PCT Pub. Date: Dec. 17, 2020

(65) Prior Publication Data
US 2022/0219629 A1    Jul. 14, 2022

(30) Foreign Application Priority Data
Jun. 14, 2019   (JP) ................................ 2019-110940

(51) Int. Cl.
*B60W 60/00*    (2020.01)
(52) U.S. Cl.
CPC .................. *B60W 60/001* (2020.02)
(58) Field of Classification Search
CPC .. B60W 60/001; G06F 1/3206; G06F 1/3287; G06F 1/3203; H04L 12/12;
(Continued)

(56) References Cited

U.S. PATENT DOCUMENTS 8,467,324 B2 * 6/2013 Yousefi ..................... G08G 1/16
                                                         370/328
2007/0108840 A1 * 5/2007 Amada ..................... H02J 9/005
                                                         307/9.1

(Continued)

FOREIGN PATENT DOCUMENTS

EP    3972083 A1    3/2022
JP    2007-133729 A    5/2007
(Continued)

OTHER PUBLICATIONS

International Search Report and Written Opinion mailed on Apr. 28, 2020, received for PCT Application PCT/JP2020/011366, Filed on Mar. 16, 2020, 9 pages including English Translation.

*Primary Examiner* — Bao Long T Nguyen
(74) *Attorney, Agent, or Firm* — XSENSUS LLP (57) ABSTRACT

A control device has an arithmetic unit that controls onboard devices of a mobile body. The arithmetic unit includes: a first functional section that is actuated regardless of a status of the mobile body and generates a control signal to one or more of the onboard devices; second functional sections that are each actuated in accordance with the status of the mobile body and each generate a control signal to the onboard devices other than the one or more onboard devices; power transmitters disposed in a power transmission path between a power source and the respective second functional sections; and a power source controller that controls supply and cutoff of power to the second functional sections in accordance with the status of the mobile body. The first functional section and the power source controller are mounted on a single chip configured as an integrated circuit.

19 Claims, 6 Drawing Sheets

(58) Field of Classification Search
CPC ............... H04L 12/40045; B60R 16/03; B60R 16/0231; B60R 25/403
See application file for complete search history.

(56) References Cited

U.S. PATENT DOCUMENTS

| | | |
|---|---|---|
| 2014/0047255 A1 | 2/2014 | Sasaki et al. |
| 2015/0112510 A1* | 4/2015 | Tokunaga ............. G06F 1/3206 |
| | | 701/1 |
| 2019/0126940 A1* | 5/2019 | Tsujioka ............... B60W 40/12 |
| 2019/0138296 A1* | 5/2019 | Ishikawa ................ H04L 67/12 |
| 2021/0311724 A1 | 10/2021 | Ishikawa et al. |

FOREIGN PATENT DOCUMENTS

| | | |
|---|---|---|
| JP | 2014-36407 A | 2/2014 |
| JP | 2015-81021 A | 4/2015 |
| JP | 2018-70312 A | 5/2018 |
| JP | 2019-77414 A | 5/2019 |
| JP | 2019-84941 A | 6/2019 |

\* cited by examiner

| | SCENE 1 (STOPPED W/O OCCUPANT) | SCENE 2 (STOPPED W/ OCCUPANT) | SCENE 3 (DURING AUTONOMOUS DRIVING) | SCENE 4 (DURING MANUAL DRIVING) | ... |
|---|---|---|---|---|---|
| ISP | OFF | OFF | ON | OFF | ... |
| AI ACCELERATOR | OFF | ON | ON | ON | ... |
| CONTROL MICROCOMPUTER | OFF | ON | ON | ON | ... |
| BURGLAR CONTROLLER | ON | OFF | OFF | OFF | ... |
| ... | ... | ... | ... | ... | |

CONTROL DEVICE FOR MOBILE BODY

CROSS-REFERENCE TO RELATED APPLICATIONS

The present application is based on PCT filing PCT/JP2020/011366, filed Mar. 16, 2020, which claims priority to JP 2019-110940, filed Jun. 14, 2019, the entire contents of each are incorporated herein by reference.

TECHNICAL FIELD

The technique disclosed herein belongs to a technical field relating to a control device for a mobile body.

BACKGROUND ART

In a mobile body having a plurality of devices, there has been known a technique for controlling actuation of an electronic control unit (ECU) that controls each of the plurality of devices.

For example, Patent Document 1 discloses a vehicle control system that controls onboard devices mounted in a vehicle as a mobile body, in which a control apparatus is divided into a plurality of functional blocks in advance; each of the plurality of functional blocks stores management information including information on a state of the vehicle in which the functional block is to be operated, area information indicating an arranged area, and domain information indicating a classified domain; and an integrated controller determines an area and a domain including the functional blocks to be operated in an identified state of the vehicle using the management information stored in the functional blocks, and prepares an environment in which the functional blocks can be operated for the determined area and domain.

CITATION LIST

Patent Document

Patent Document 1: Japanese Unexamined Patent Publication No. 2018-70312

SUMMARY OF THE INVENTION

Technical Problem

In recent years, devices mounted in a mobile body, such as a vehicle, are controlled mainly by electronic control, and a microcomputer is provided for each device. For this reason, the number of microcomputers per mobile body is increasing, and some automobiles have several hundreds of microcomputers. As the number of microcomputers increases, a configuration of an electrical system becomes complicated.

It is therefore conceivable to incorporate a microcomputer function controlling the devices into one arithmetic unit. In such a configuration, if all the functions of the arithmetic unit are constantly actuated, power consumption may increase.

It is therefore an object of the technique disclosed herein to simplify a configuration of an electrical system of a mobile body and to reduce an increase in power consumption.

Solution to the Problems

To achieve the above object, the technique disclosed herein includes: a plurality of sensors that acquire information including an external environment of the mobile body; and an arithmetic unit that controls onboard devices of the mobile body in response to the information input from the plurality of sensors, wherein the arithmetic unit includes: a first functional section that is actuated regardless of a status of the mobile body and generates a control signal to one or more of the onboard devices; second functional sections that are each actuated in accordance with the status of the mobile body and each generate a control signal to the onboard devices other than the one or more onboard devices; power transmitters disposed in a power transmission path between a power source and the respective second functional sections; and a power source controller that outputs a control signal to the respective power transmitters in accordance with the status of the mobile body identified based on the information input from the sensors, to control supply and cutoff of power to the second functional sections, and the first functional section and the power source controller are mounted on a single chip configured as an integrated circuit.

According to this configuration, the arithmetic unit includes the plurality of functional sections to set a control amount of the onboard device of the mobile body, and the first functional section and the power source controller are mounted on a single chip. It is therefore possible to reduce the number of chips in the arithmetic unit. In addition, the harness for supplying power from the power source to the first functional section can be omitted. This can simplify the configuration of the electrical system of the mobile body.

Further, the power source controller can cut the supply of power to the second functional sections in accordance with the status of the mobile body. Consequently, an average value of the power consumption in total operating time of the mobile body can be lowered.

In the control device for the mobile body, each of the second functional sections may have a function of executing an autonomous traveling function which sets a traveling route to be traveled by the mobile body and sets a motion of the mobile body for following the traveling route.

That is, in the autonomous traveling function, it is necessary to calculate the traveling route of the mobile body and set the motion of the mobile body for following the traveling route, and the second functional sections are required to have a high processing capacity. Thus, the power consumption of the second functional sections tends to be large. Thus, when it is not necessary to exert the autonomous traveling function, such as while the mobile body is stopped, power supply to some or all of the second functional sections is cut off. This can reduce an increase in the power consumption.

In the control device for the mobile body, the arithmetic unit may further include a communication unit that transmits the control signals generated by the first functional section and the second functional sections to the onboard devices, and the communication unit may be mounted on the same chip where the first functional section and the power source controller are mounted.

According to this configuration, the mounting of the communication section on the same chip where the first functional section and the power source controller are mounted makes it possible to reduce the number of chips. In addition, the harness for supplying power from the power source to the communication section can be omitted. This can further simplify a configuration of the electrical system of the mobile body.

In the control device for the mobile body, the mobile body may be an automobile, and the first functional section may control a keyless entry function of the automobile.

The automobile has a large number of devices on board. Thus, the integration of the functional sections into a single arithmetic unit and the mounting of the sections that require constant supply of power on one chip can simplify the electrical system more appropriately.

Advantages of the Invention

As described above, the technique disclosed herein can simplify the configuration of the electrical system of the mobile body and reduce an increase in the power consumption.

DESCRIPTION OF EMBODIMENTS

Example embodiments will now be described in detail with reference to the drawings.

Figure 1:
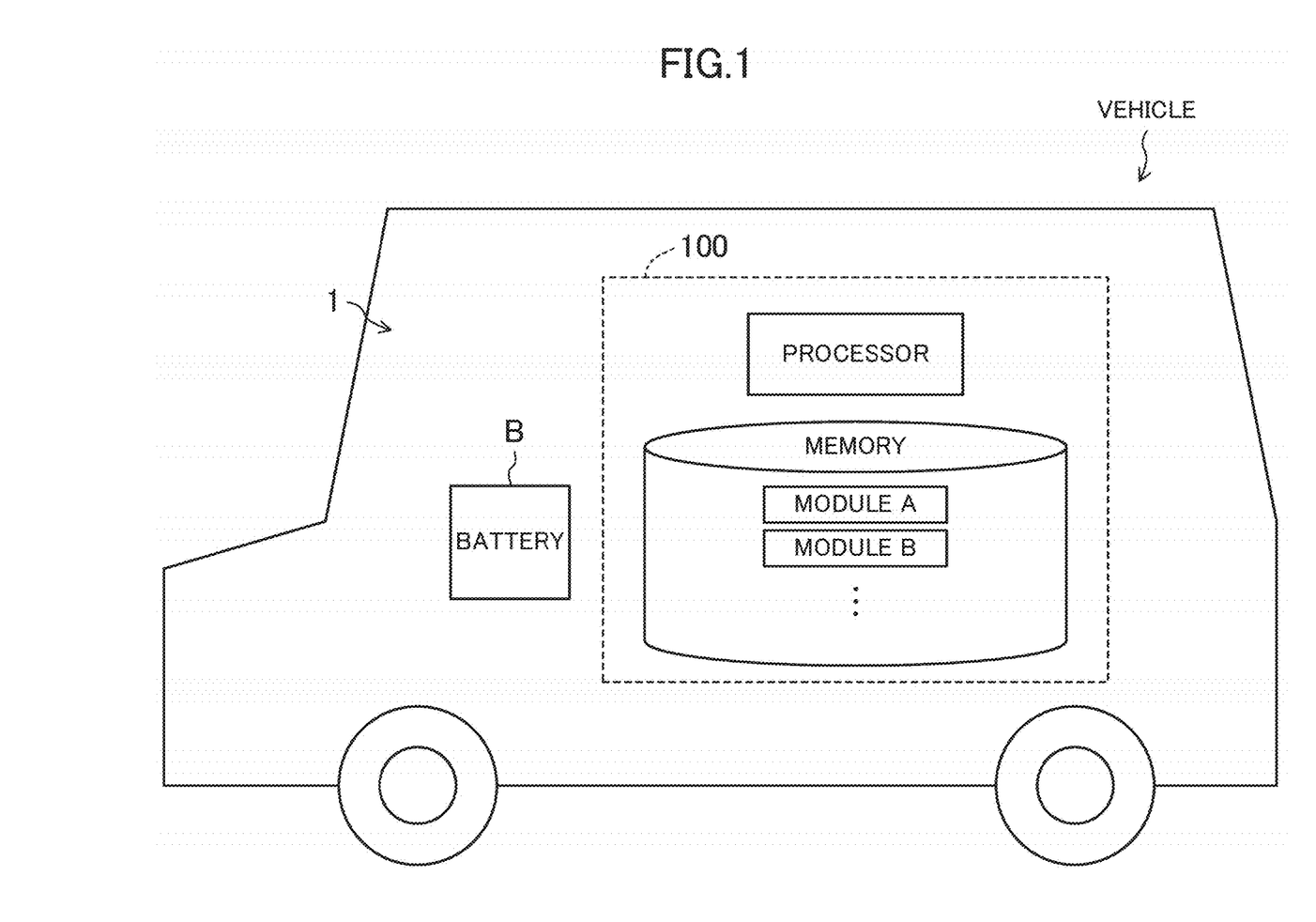
FIG. 1 is a schematic diagram showing a vehicle on which a power source control device according to an example embodiment is mounted.

FIG. 1 is a diagram showing a vehicle on which a power source control device 1 according to an embodiment is mounted. In the present embodiment, the mobile body is a vehicle of an automobile. In the following description, the mobile body may simply be referred to as a vehicle.

The power source control device 1 includes one arithmetic unit 100. The arithmetic unit 100 is configured as being in a single casing and is mounted on the vehicle. The arithmetic unit 100 includes at least one chip configured as an integrated circuit. The arithmetic unit 100 has a processor having a CPU, a memory storing a plurality of modules, and the like. The arithmetic unit 100 has a function of selecting to which module in the memory the power stored in a battery B, which is a power source mounted in the vehicle, is supplied. Such a function is stored as software in a module of the memory. The number of processors and the number of memories are not limited to one, and the arithmetic unit 100 may have two or more processors and memories.

The power source control device 1 includes a plurality of sensors 10 to 18 that acquire information including an external environment of the vehicle, and one arithmetic unit 100. The sensors include, for example, a plurality of cameras 10 that is provided on a body or the like of the vehicle and captures images of the external environment, a plurality of radars 11 provided on the body or the like of the vehicle and detecting a target or the like outside the vehicle, a position sensor 12 that detects a position of the vehicle (vehicle position information) using a global positioning system (GPS), a vehicle speed sensor 13 that detects a traveling speed of the vehicle, an occupant status sensor 14 that acquires a status of an occupant including the presence or absence of the occupant of the vehicle, a parking lock sensor 15 that detects a locked state of a parking lock of the vehicle, an external communication unit 16 that receives communication information from another vehicle located around the subject vehicle and update information of a program stored in the arithmetic unit 100 and which inputs such information to the arithmetic unit 100, a keyless sensor 17 that receives a signal from a portable device of a keyless entry system, and a burglar sensor 18 for an anti-theft purpose. The sensors 10 to 18 described herein are examples of sensors that input the information to the arithmetic unit 100, and inputting the information to the calculator 100 from sensors other than the sensors 10 to 18 is not excluded in the present embodiment.

The cameras 10 are arranged to image the surroundings of the vehicle at 360° in the horizontal direction. Each camera 10 captures optical images showing the environment outside the vehicle to generate image data. Each of the cameras 10 outputs the image data generated to the arithmetic unit 100.

Like the cameras 10, the radars 11 are arranged so that the detection range covers 360° of the vehicle in the horizontal direction. The type of the radars 11 is not particularly limited. For example, a millimeter wave radar or an infrared radar may be adopted.

The occupant status sensor 14 is comprised of, for example, an in-car camera that captures an image inside the cabin and a load sensor provided in a seat cushion. Each occupant status sensor 14 outputs the generated image data and a detection result to the arithmetic unit 100. The in-car camera comprising the occupant status sensor 14 may be comprised of a camera with lower performance, e.g., lower resolution, than the cameras 10 capturing the outside of the vehicle.

Figure 2:
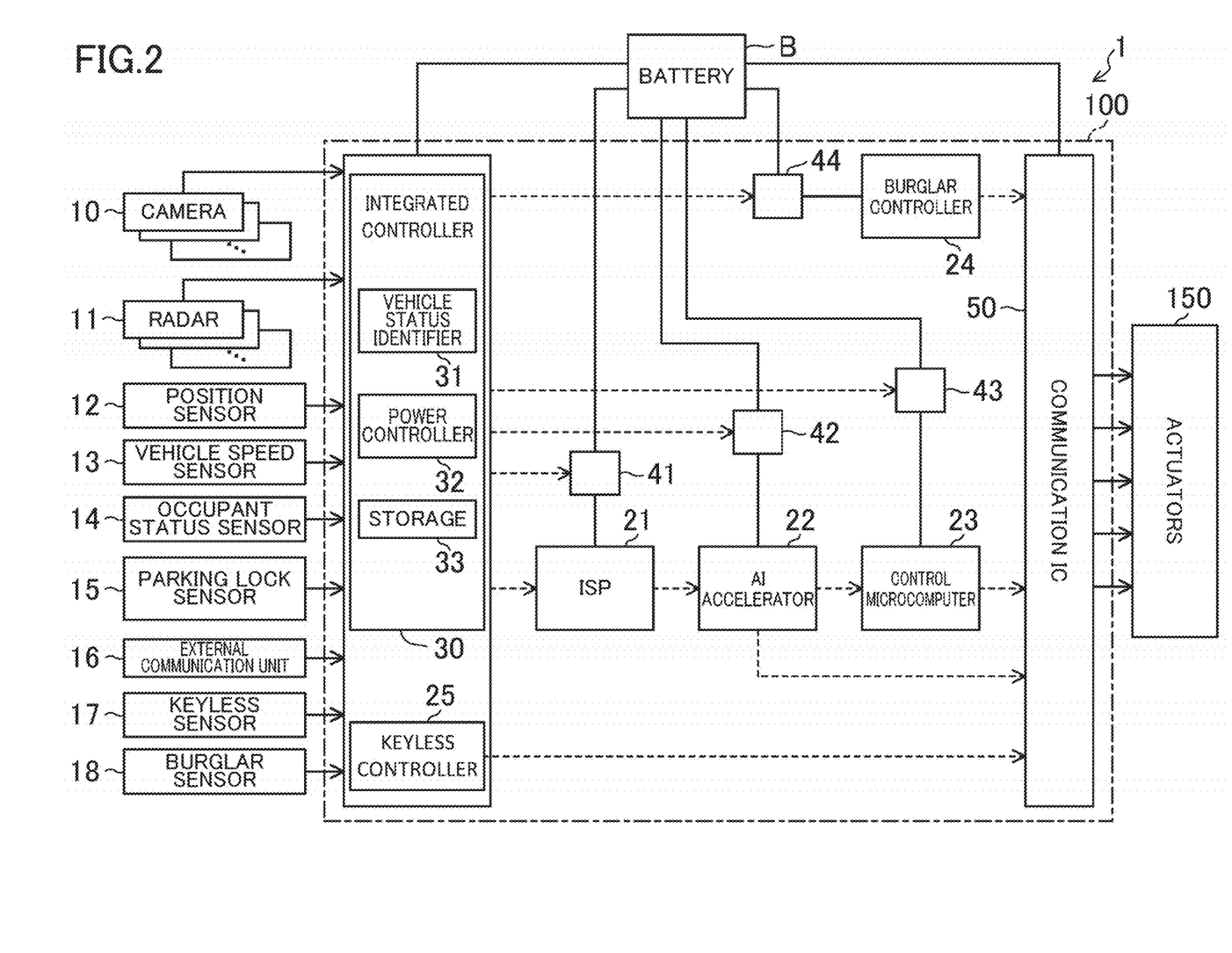
FIG. 2 is a configuration diagram of an electrical system of the vehicle.

The arithmetic unit 100 controls an onboard device of the vehicle in response to the information input from the plurality of sensors 10 to 18. The arithmetic unit 100 includes an image signal processor (ISP) 21, an AI accelerator 22, and a control microcomputer 23. What is actually controlled by the arithmetic unit 100 is an actuator 150 of the onboard device. The actuator 150 includes not only the actuators of traveling devices such as an engine, a brake, and a steering, but also the actuators of so-called body-related devices such as headlights and an air conditioner.

The ISP 21 performs image processing on the outputs of the cameras 10. For example, the ISP 21 deletes pixels unnecessary for the processing (e.g., object recognition) by the AI accelerator 22 among the elements included in the image, and thins out the data related to color (e.g., all of the vehicles are represented by the same color), for the image data captured by the cameras 10. An image signal processed by the ISP 21 is input to the AI accelerator 22. In the present embodiment, the image data of the in-car camera comprising the occupant status sensor 14 is input to the AI accelerator 22 without going through the ISP 21.

The AI accelerator 22 recognizes an object around the vehicle by using a learned model generated by deep learning based on an image outside the vehicle which is input from the ISP 21. The AI accelerator 22 integrates information, such as a relative distance to an object acquired by the radars 11, with the image outside the vehicle and a result of the recognition of the object, and creates a 3D map showing the vehicle's external environment. The AI accelerator 22 estimates the status of an occupant in the cabin of the vehicle based on the image data from the in-car camera and information obtained by other sensors comprising the occupant status sensor 14. The AI accelerator 22 estimates the status of the occupant in the cabin of the vehicle using a learned model generated by deep learning. The status of the occupant refers to health conditions and emotions of the occupant. The health conditions of the occupant include, for example, good health condition, slightly fatigue, poor health condition, decreased consciousness, and the like. The emotions of the occupant include, for example, fun, normal, bored, annoyed, uncomfortable, and the like.

When the vehicle is autonomously driven, the control microcomputer 23 creates a 2D map for calculating a traveling route of the vehicle based on the 3D map created by the AI accelerator 22. The control microcomputer 23 generates the traveling route of the vehicle based on the created 2D map. The control microcomputer 23 determines a target motion of the vehicle for following the generated traveling route, and calculates a driving force, a braking force, and a steering amount for achieving the determined target motion. The autonomous driving described herein includes not only fully autonomous driving in which a driver does not perform steering operation or the like, but also assisted driving in which the steering operation or the like of the driver is assisted.

On the basis of the above, the ISP 21, the AI accelerator 22, and the control microcomputer 23 are capable of executing a function of autonomous traveling (here, autonomous driving function) which sets a traveling route to be traveled by the vehicle and sets a motion of the vehicle for following the traveling route.

Meanwhile, the control microcomputer 23 calculates the driving force, the braking force, and the steering amount in accordance with the operations of an accelerator pedal, a brake pedal, and a steering wheel by the occupant while the occupant manually drives the vehicle by operating, e.g., the accelerator pedal.

Further, the control microcomputer 23 controls, for example, air conditioning (air volume and temperature) based on the status of the occupant estimated by the AI accelerator 22.

Further, the control microcomputer 23 reprograms the corresponding program when, for example, the update information of the program stored in the control microcomputer 23 is acquired via the external communication unit 16.

The arithmetic unit 100 further includes a burglar controller 24 that controls an anti-theft function. When the burglar sensor 18 detects an unauthorized intrusion into the cabin of the vehicle, the burglar controller 24 outputs an actuation signal to a burglar alarm so as to actuate the burglar alarm.

The ISP 21, the AI accelerator 22, the control microcomputer 23, and the burglar controller 24 correspond to the second functional sections that generate the control signal to the onboard devices of the vehicle in accordance with the status of the vehicle. Hereinafter, the ISP 21, the AI accelerator 22, the control microcomputer 23, and the burglar controller 24 may be collectively referred to as the second functional sections 21 to 24. A second functional section other than these second functional sections may be mounted in the arithmetic unit 100.

The arithmetic unit 100 further includes a keyless controller 25 that controls a keyless entry function. The keyless controller 25 receives information associated with an operation of the portable device from the keyless sensor 17 via an integrated controller 30 described later. The keyless controller 25 basically outputs an actuation signal to the actuator 150 so as to lock a door. Meanwhile, upon receipt of the signal for unlocking the door via the keyless sensor 17, the keyless controller 25 outputs an actuation signal to the actuator 150 so as to unlock the door.

As will be described in detail later, the keyless controller 25 is a functional section that is constantly actuated regardless of the status of the vehicle in order to lock and unlock the door. That is, the keyless controller 25 corresponds to the first functional section that is actuated regardless of the status of the vehicle and generates a control signal to one or more of the onboard devices (here, the door lock).

The signals of the functional sections 21 to 25 are input to a communication IC 50 provided in the arithmetic unit 100, and are transmitted to each actuator 150 via the communication IC 50.

The arithmetic unit 100 further includes the integrated controller 30 capable of communicating with each of the second functional sections 21 to 24. The integrated controller 30 has a vehicle status identifier 31 that identifies the status of the vehicle based on the information input from the sensors 10 to 18, a power source controller 32 that controls supply and cutoff of power to the second functional sections 21 to 24 so that the power is supplied to a predetermined combination of the second functional sections 21 to 24 in accordance with the identified status of the vehicle, and a storage 33 that stores a power supply table 321 described later.

The vehicle status identifier 31 identifies the status of the vehicle, particularly a scene of the vehicle including the presence or absence of occupants. For example, the vehicle status identifier 31 identifies whether the vehicle is located in an urban area or a suburb on the basis of information from the position sensor 12, and identifies whether the vehicle is traveling or stopped on the basis of information from the position sensor 12 and the vehicle speed sensor 13. Further, the vehicle status identifier 31 identifies whether the vehicle is parked, for example, on the basis of information from the parking lock sensor 15. Further, the vehicle status identifier 31 identifies the presence or absence of occupants in the cabin of the vehicle on the basis of, for example, information from the occupant status sensor 14. In addition, the vehicle status identifier 31 identifies whether reprogramming is required, for example, depending on whether the update information of the program of the control microcomputer 23 has been input from the external communication unit 16.

Figure 3:
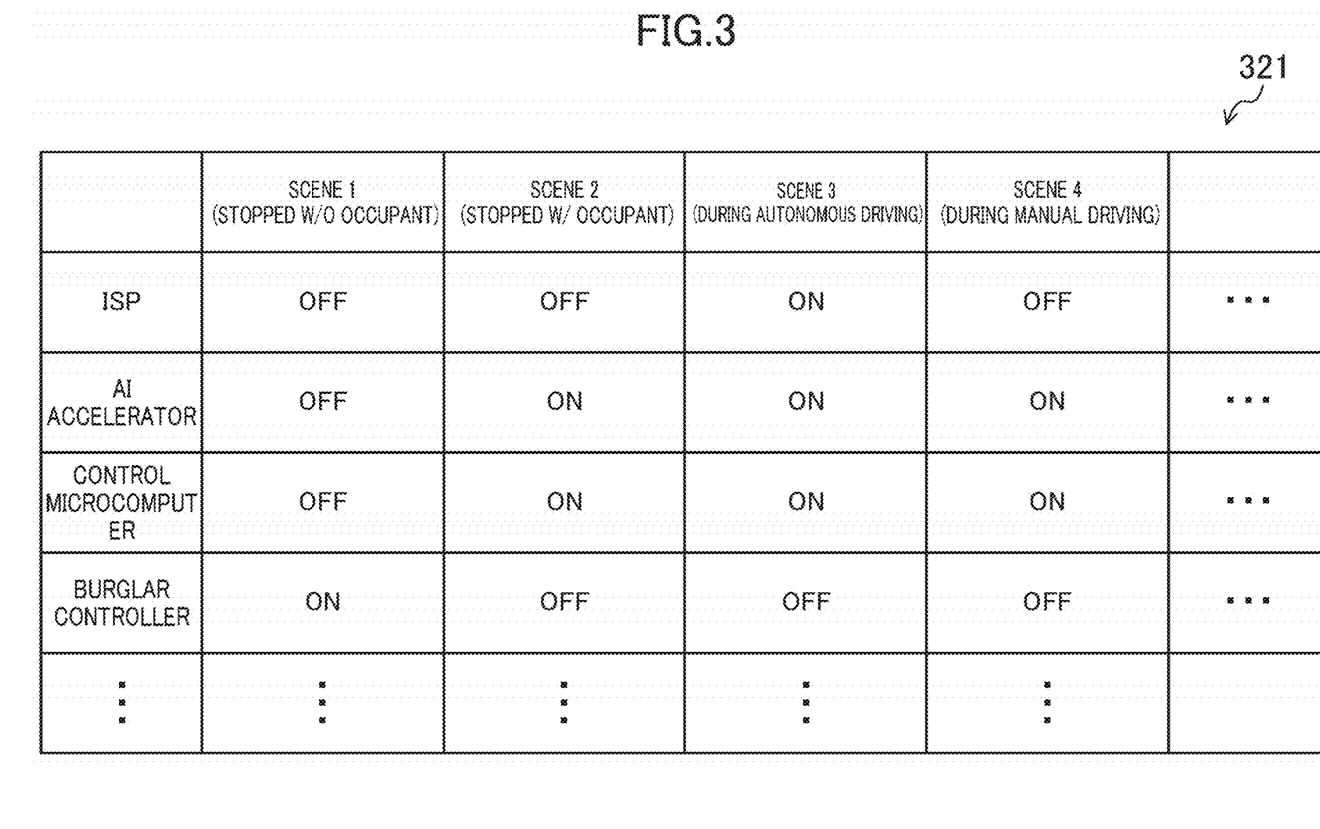
FIG. 3 is a diagram showing an example power supply table.

The power source controller 32 controls the supply and cutoff of the power to the second functional sections 21 to 24 based on the power supply table 321. As illustrated in FIG. 3, the power supply table 321 is a table specifying, for each status of the vehicle (for each scene of the vehicle), combinations of the second functional sections 21 to 24 to which power is to be supplied. In the power supply table 321 shown in FIG. 3, "ON" in the table indicates that power is supplied, and "OFF" indicates that power is not supplied.

For example, as shown in FIG. 3, the power supply table 321 defines that power is supplied to the burglar controller 24 but not to the ISP 21, the AI accelerator 22, and the control microcomputer 23 when the vehicle is stopped and there is no occupant in the cabin of the vehicle (scene 1 in FIG. 3). This is because when the vehicle is stopped and there is no occupant, functions for autonomous driving are not necessary, but monitoring of intrusion through the door into the cabin of the vehicle is necessary.

Further, as shown in FIG. 3, the power supply table 321 defines that power is supplied to the AI accelerator 22 and the control microcomputer 23 but not to the ISP 21 and the burglar controller 24 when the vehicle is stopped and there is an occupant in the cabin of the vehicle (scene 2 in FIG. 3). This is because when the vehicle is stopped and there is an occupant, the image processing of the cameras 10 is not necessary and there is no risk of theft, but control such as air conditioning is necessary to prepare the environment in the cabin of the vehicle.

Further, as shown in FIG. 3, the power supply table 321 defines that power is supplied to the ISP 21, the AI accelerator 22, and the control microcomputer 23 but not to the burglar controller 24 when the vehicle is autonomously traveling (scene 3 in FIG. 3). This is because it is necessary to actuate functions for autonomous driving during autonomous driving of the vehicle.

Further, as shown in FIG. 3, the power supply table 321 defines that power is supplied to the AI accelerator 22 and the control microcomputer 23 but not to the ISP 21 and the burglar controller 24 when the vehicle is manually traveling (scene 4 in FIG. 3). This is because image processing of the cameras 10 is not necessary, but control such as air conditioning is necessary to prepare the environment in the cabin of the vehicle during traveling by manual driving.

Note that the scenes 1 to 4 shown in FIG. 3 are examples of roughly divided types of the status of the vehicle for simplicity of description. Specifically, in the power supply table 321, the types of the status of the vehicle are divided in more detail based on where the vehicle is traveling, whether the engine is turned on or off, or the like. Further, the details of the power supply table 321 shown in FIG. 3 may be changed in accordance with the types or the like of the vehicle. For example, in a high-grade vehicle, power may be supplied to the burglar controller 24 as well when there is an occupant in the cabin of the vehicle or while the vehicle is traveling.

The keyless controller 25 is actuated all the time regardless of the status of the vehicle in order to lock and unlock the door, and is therefore constantly supplied with power. The integrated controller 30, too, is constantly supplied with power in order to identify the status of the vehicle and control the power supply of the second functional sections 21 to 24.

In the present embodiment, power transmitters 41 to 44 are disposed in a power transmission path between the battery B as a power source and the second respective functional sections 21 to 24. In the following description, for convenience, the power transmitter between the battery B and the ISP 21 is referred to as a first power transmitter 41; the power transmitter between the battery B and the AI accelerator 22 is referred to as a second power transmitter 42; the power transmitter between the battery B and the control microcomputer 23 is referred to as a third power transmitter 43; and the power transmitter between the battery B and the burglar controller 24 is referred to as a fourth power transmitter 44.

The first to fourth power transmitters 41 to 44 are connected to the battery B mounted in the vehicle. The first to fourth power transmitters 41 to 44 each include a switch circuit that connects (turns on) and cuts off (turns off) the power transmission path between the battery B and the respective second functional sections 21 to 24, and a DCDC converter that adjusts a voltage of the battery B. The first to fourth power transmitters 41 to 44 turn on the switch circuit upon receipt, from the integrated controller 30 (particularly the power source controller 32), of a control signal (hereinafter referred to as an ON signal) that turns on the switch circuit. That is, in the present embodiment, when the control signal (ON signal) is input from the integrated controller 30 to the power transmitters 41 to 44, power is supplied to the second functional sections 21 to 24 corresponding to the first to fourth power transmitters 41 to 44 which have received the control signal (for example, to the ISP 21 corresponding to the first power transmitter 41).

The power source controller 32 of the integrated controller 30 checks the power supply table 321 for the status of the vehicle identified by the vehicle status identifier 31. The power source controller 32 outputs the ON signal to the power transmitters 41 to 44 corresponding to the combination of the second functional sections 21 to 24 specified in the power supply table 321.

For example, when the vehicle status identifier 31 identifies that the vehicle is stopped and that there is an occupant in the vehicle (scene 2 in FIG. 3), the power source controller 32 outputs the ON signal to the second and third power transmitters 42 and 43 but does not output the ON signal to the first and fourth power transmitters 41 and 44 in accordance with the power supply table 321. As a result, power is supplied to the AI accelerator 22 and the control microcomputer 23, while power is not supplied to the ISP 21 and the burglar controller 24.

Figure 4:
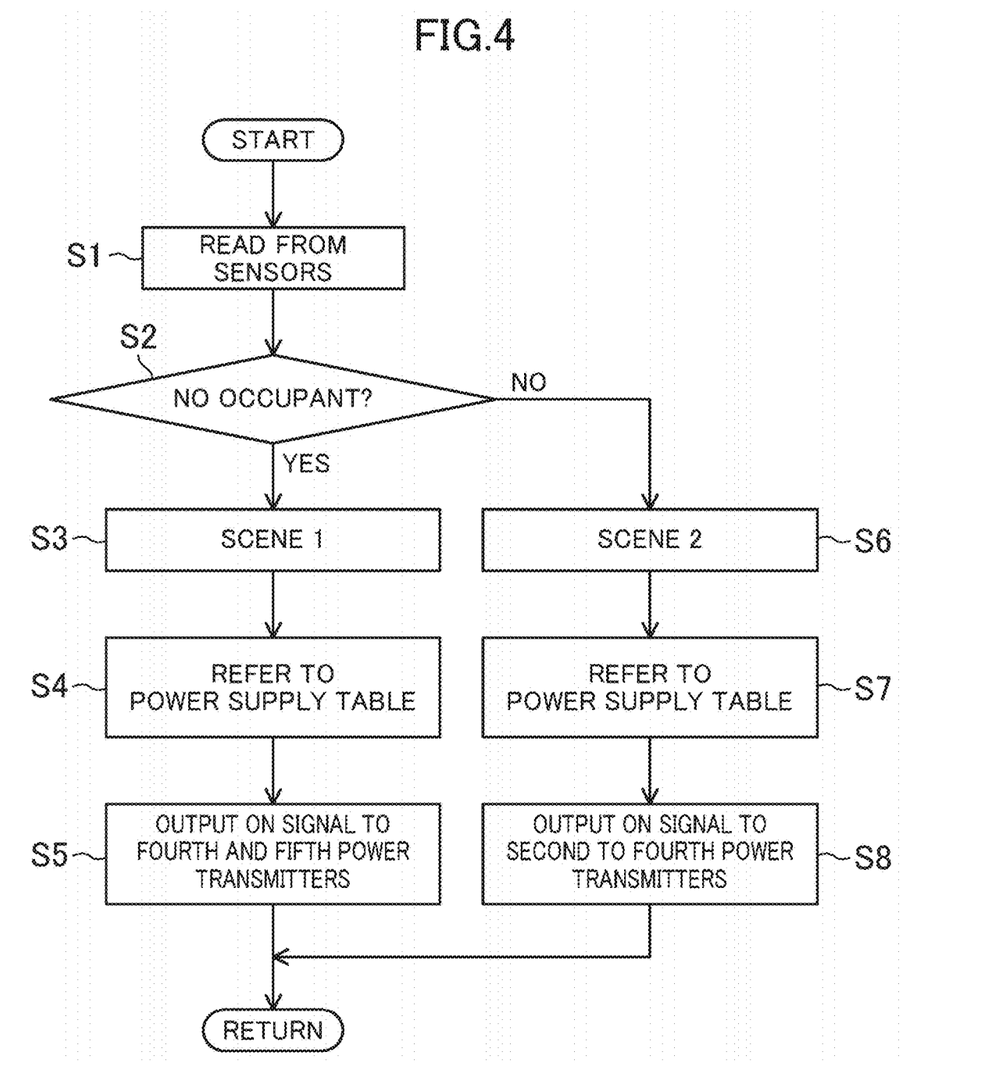
FIG. 4 is a flowchart showing processing operations of power source control by an integrated controller.

The flowchart shown in FIG. 4 shows processing operations of power source control by an integrated controller 30. The flowchart illustrated herein is directed to the processing operations on the premise that the vehicle is stopped (directed to the scenes 1 and 2 shown in FIG. 3) for brief explanation of an example. In the practical flowchart, types of the status of the vehicle are divided in more detail based on, for example, whether the engine is turned on or off.

First, in step S1, the integrated controller 30 reads information from the sensors 10 to 18.

In step S2, the integrated controller 30 determines whether there is an occupant in the cabin of the vehicle. In this step S2, for example, the integrated controller 30 determines the presence or absence of the occupant based on the detection result of the occupant status sensor 14. In step S2, if YES, where there is no occupant in the vehicle, the processing proceeds to step S3, whereas if NO, where there is an occupant in the vehicle, the processing proceeds to step S6.

In step S3, the integrated controller 30 identifies that the status of the vehicle is the scene 1.

In the next step S4, the integrated controller 30 refers to the power supply table 321 to identify the power transmitter to which the ON signal is to be sent when the vehicle status is the scene 1.

In the next step S5, the integrated controller 30 outputs the ON signal to the fourth power transmitter 44. After step S5, the processing returns.

Meanwhile, in step S6, the integrated controller 30 identifies that the status of the vehicle is the scene 2.

In the next step S7, the integrated controller 30 refers to the power supply table 321 to identify the power transmitter to which the ON signal is to be sent when the vehicle status is the scene 2.

In the next step S8, the integrated controller 30 outputs the ON signal to the second and third power transmitters 42 and 43. After step S8, the processing returns.

As described above, the supply and cutoff of power to the second functional sections 21 to 24 are controlled.

Here, as described above, the keyless controller 25 and the integrated controller 30 need to be constantly actuated regardless of the status of the vehicle. Power is therefore constantly supplied from the battery B to the keyless controller 25 and the integrated controller 30. Thus, in the present embodiment, the keyless controller 25 and the integrated controller 30 are mounted on the same chip. The keyless controller 25 and the integrated controller 30 mounted on one chip not only contribute to reducing the number of chips in the arithmetic unit 100, but also make it possible to omit a harness for supplying power from the battery B to the keyless controller 25. This can simplify a configuration of the electrical system of the vehicle. In general, sections that are constantly actuated, such as the keyless controller 25 and the integrated controller 30, are required to have high strength against disturbance rather than a processing capacity. Thus, the mounting of the keyless controller 25 and the integrated controller 30 on one chip makes it possible for the keyless controller 25 and the integrated controller 30 to be manufactured in a manufacturing process that ensures sufficient strength. In addition, manufacturing costs can be reduced as compared to a case where the keyless controller 25 and the integrated controller 30 are mounted on independent chips. The "chip" described herein is, for example, a semiconductor chip configured as an integrated circuit device, and is equipped with software for executing control of the keyless controller 25, the integrated controller 30, and the like.

In the present embodiment, the keyless controller 25 has a monitoring function for monitoring other functional sections (in this example, the ISP 21, the AI accelerator 22, the control microcomputer 23, and the burglar controller 24). The monitoring mentioned herein is to confirm whether the functional sections are actuated, for example, whether there is an abnormality in the power supply path.

The other functional sections are monitored by the keyless controller 25 based on the power supply table 321 described above. Specifically, the keyless controller 25 monitors the functional section that is labeled "OFF" in the power supply table 321 as a monitoring target, and outputs a monitoring signal to the functional section targeted for monitoring. At this time, the keyless controller 25 also outputs a control signal to the power transmitter corresponding to the functional section targeted for monitoring so that minimum power is supplied to the functional section targeted for monitoring. For example, suppose that the vehicle is stopped, and that the ISP 21 is selected to be the target for monitoring. In this situation, the keyless controller 25 outputs a monitoring signal to the ISP 21 and outputs a control signal to the first power transmitter 41. The minimum power mentioned herein is a power capable of returning a signal to the keyless controller 25 in response to the monitoring signal, as will be described later. The control signal to the power transmitter may be output from the power source controller 32 that has received the signal from the keyless controller 25.

The functional section which has received the monitoring signal is supplied with power, is actuated if the functional section operates normally, and thus sends a signal corresponding to the monitoring signal back to the keyless controller 25. On the other hand, if there is an abnormality such as a disconnection of a power supply path, the power is not properly supplied to the functional section, and the signal corresponding to the monitoring signal is not returned. As a result, the keyless controller 25 can confirm whether there is an abnormality in the power supply path of the functional section targeted for monitoring.

As described above, the keyless controller 25 is a functional section that is actuated regardless of the status of the vehicle, and operates even when the vehicle is stopped, which makes it possible for the keyless controller 25 to properly monitor the actuation status of other functional sections both while the vehicle is traveling and while the vehicle is stopped. Further, since the keyless controller 25 is manufactured to have high strength against disturbance, it is less likely that the monitoring function deteriorates due to an influence of disturbance. It is therefore possible to increase reliability in monitoring the other functional sections. Furthermore, since the keyless controller 25 is mounted on the same chip where the integrated controller 30 is mounted, it is possible to reduce the number of chips and communication wiring as compared to a case where another microcomputer for monitoring is independently provided, which further simplify the configuration of the electrical system of the vehicle.

The power source control device 1 of the present embodiment includes: a plurality of sensors 10 to 18 that acquire information including an external environment of a vehicle; and an arithmetic unit 100 that controls onboard devices of the vehicle in response to the information input from the plurality of sensors 10 to 18, wherein the arithmetic unit 100 includes: a first functional section (a keyless controller 25) that is actuated regardless of the status of the vehicle and generates a control signal to one or more of the onboard devices;

second functional sections (the ISP 21, the AI accelerator 22, the control microcomputer 23, and the burglar controller 24) that are actuated in accordance with the status of the vehicle and generate a control signal to the onboard devices other than the one or more onboard devices; first to fourth power transmitters 41 to 44 disposed in power transmission paths between a battery B and the respective second functional sections 21 to 24; and a power source controller 32 that outputs a control signal to the respective power transmitters 41 to 44 in accordance with the status of the vehicle identified based on the information input from the sensors 10 to 18, to control supply and cutoff of power to the second functional sections 21 to 24, the first functional section 25 and the power source controller 32 are mounted on a single chip. According to this configuration, it is possible to reduce the number of chips in the arithmetic unit 100. In addition, the harness for supplying power from the battery B to the first functional section 25 can be omitted. This can simplify the configuration of the electrical system of the vehicle.

Further, the control of the supply and cutoff of power to the functional sections which do not require power to be supplied thereto depending on the status of the vehicle, such as the second functional sections 21 to 24, makes it possible to reduce the average value of power consumption in the total operating time of the vehicle.

In particular, in the present embodiment, the ISP 21, the AI accelerator 22, and the control microcomputer 23 are capable of executing a function of autonomous driving which sets a traveling route to be traveled by the vehicle and sets a motion of the vehicle for following the traveling route. In the autonomous driving function, it is necessary to calculate the traveling route of the vehicle and set the motion of the vehicle for following the traveling route, and the functional sections 21 to 23 are required to have high processing capability. Thus, the power consumption of the functional sections 21 to 23 for achieving the function of the autonomous driving tends to be large. Thus, when it is not necessary to exert the autonomous driving function, such as while the vehicle is stopped, power supply to some or all of the functional sections 21 to 23 for achieving the autonomous driving function is cut off to reduce an increase in the power consumption. In this manner, reduction in the power consumption is achieved more appropriately.

<Variations>

Figure 5:
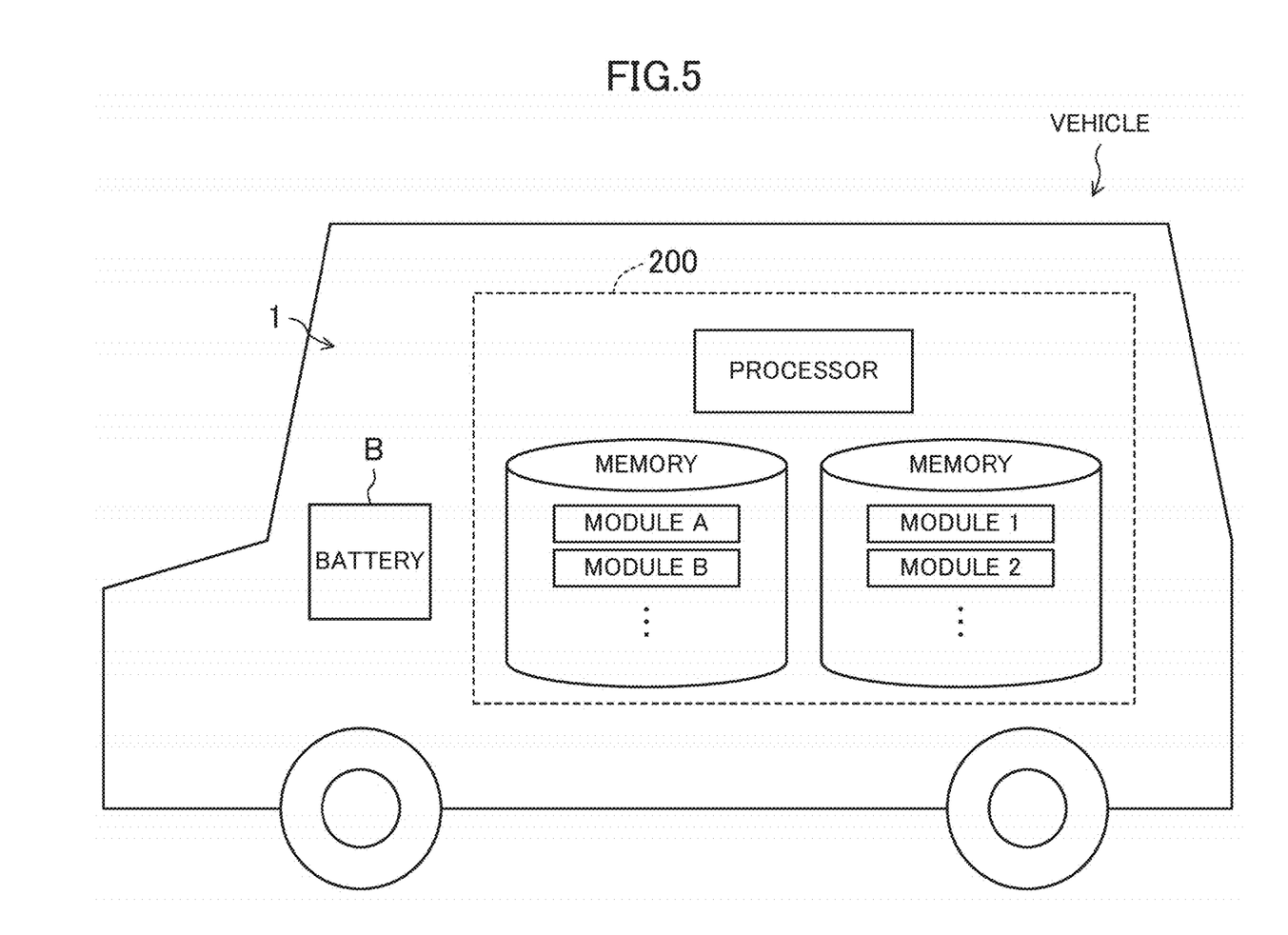
FIG. 5 is a schematic view showing a vehicle having an electrical system according to a variation of the embodiment.
Figure 6:
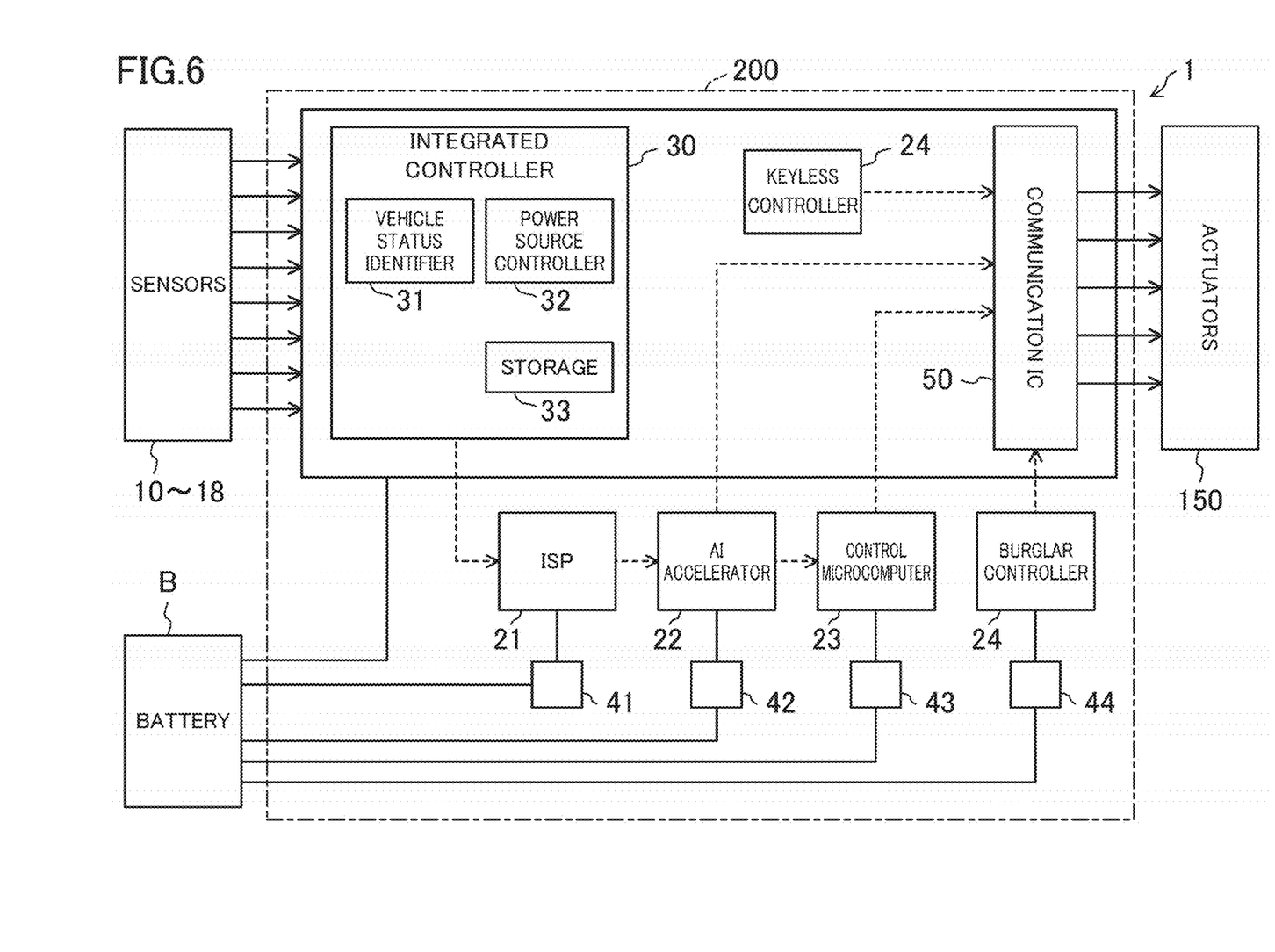
FIG. 6 is a configuration diagram of the electrical system according to the variation.

FIGS. 5 and 6 show a variation of the present embodiment. In this variation, the arithmetic unit 200 includes separate memories: a memory including the integrated controller 30 and the like and a memory including the ISP 21 and the like. The communication IC 50 is included in the same memory where the keyless controller 25 and the integrated controller 30 are included, and is mounted on the same chip as these controllers 25 and 30.

Similarly to the keyless controller 25 and the integrated controller 30, the communication IC 50 is constantly supplied with power to transmit control signals from the functional sections 21 to 25 to the onboard devices. Thus, the communication IC 50 may be mounted on the same chip as the keyless controller 25 and the integrated controller 30. The mounting of the communication IC 50 on the same chip as the keyless controller 25 and the power source controller 32 not only contribute to reducing the number of chips, but also makes it possible to omit a harness for supplying power from the battery B to the communication IC 50. This can further simplify a configuration of the electrical system of the vehicle.

Other Embodiments

The present disclosure is not limited to the embodiments described above, and may be modified within the scope of the claims.

For example, in the above embodiment, a vehicle of an automobile is illustrated as the mobile body. However, the configuration is not limited thereto, and the mobile body may be a transport robot that transports a product in a factory, a warehouse, or the like.

The embodiments described above are merely examples in nature, and the scope of the present disclosure should not be interpreted in a limited manner. The scope of the present disclosure is defined by the appended claims, and all variations and modifications belonging to a range equivalent to the range of the claims are within the scope of the present disclosure.

INDUSTRIAL APPLICABILITY

The technique disclosed herein is useful in reducing an increase in power consumption in a power source control device for a mobile body.

DESCRIPTION OF REFERENCE CHARACTERS

1 Power Source Control Device
10 Camera (Sensor)
11 Radar (Sensor)
12 Position Sensor (Sensor)
13 Vehicle Speed Sensor (Sensor)
14 Occupant Status Sensor (Sensor)
15 Parking Lock Sensor (Sensor)
16 External Communication Unit (Sensor)
17 Keyless Sensor (Sensor)
18 Burglar Sensor (Sensor)
21 ISP (Second Functional Section)
22 AI Accelerator (Second Functional Section)
23 Control Microcomputer (Second Functional Section)
24 Burglar Controller (Second Functional Section)
25 Keyless Controller (First Functional Section)
30 Integrated Controller
32 Power Source Controller
33 Storage
41 First Power Transmitter
42 Second Power Transmitter
43 Third Power Transmitter
44 Fourth Power Transmitter
50 Communication IC (Communication Unit)
100 Arithmetic Unit
B Battery

The invention claimed is:

1. A control device for a mobile body, the control device comprising:
a plurality of sensors that acquire information including an external environment of the mobile body; and
circuitry configured to control onboard devices of the mobile body in response to the information input from the plurality of sensors, wherein
the circuitry includes:
a first functional control circuit configured to generate a control signal to one or more of the onboard devices regardless of a status of the mobile body;
at least two second functional control circuits that are each actuated in accordance with the status of the mobile body and each generate a control signal to the onboard devices other than the one or more onboard devices;
power transmitters disposed in a power transmission path between a power source and the respective second functional control circuits; and
a power source control circuit that outputs a control signal to the respective power transmitters in accordance with the status of the mobile body identified based on the information input from the sensors, to control supply and cutoff of power only to the second functional control circuits out of the first functional control circuit and the second functional control circuits,
wherein the first functional control circuit is constantly supplied with power regardless of the control by the power source control circuit, and
the first functional control circuit and the power source control circuit are mounted on a single chip configured as an integrated circuit.

2. The control device of claim 1, wherein
each of the second functional control circuits has a function of executing an autonomous traveling function which sets a traveling route to be traveled by the mobile body and sets a motion of the mobile body for following the traveling route.

3. The control device of claim 2, wherein
the circuitry further includes a communication circuit that transmits the control signals generated by the first functional control circuit and the second functional control circuits to the onboard devices, and
the communication circuit is mounted on the same chip where the first functional control circuit and the power source control circuit are mounted.

4. The control device of claim 3, wherein
the mobile body is an automobile, and
the first functional control circuit controls a keyless entry function of the automobile.

5. The control device of claim 1, wherein
the circuitry further includes a communication circuit configured to transmit the control signals generated by the first functional control circuit and the second functional control circuits to the onboard devices, and
the communication circuit is mounted on the same chip where the first functional control circuit and the power source control circuit are mounted.

6. The control device of claim 5, wherein
the mobile body is an automobile, and
the first functional control circuit controls a keyless entry function of the automobile.

7. The control device of claim 5, wherein
the power source control circuit is configured to control the supply and cutoff of power to the second functional control circuits is based on a power supply table specifying, for each scene of the mobile body, a combination of the second functional control circuits to which power is to be supplied, the first functional control circuit is further configured to monitor whether the second functional control circuits are actuatable, and select one or more of the second functional control circuits to be monitored as a monitoring target based on the power supply table.

8. The control device of claim 7, wherein,
the first functional control circuit is further configured to output a monitoring signal to each of the second functional control circuits selected to be monitored.

9. The control device of claim 8, wherein, when supplied with power, each of the second functional control circuits is further configured to return the monitoring signal to the first functional control circuit.

10. The control device of claim 9, wherein the first functional control circuit is further configured to output a control signal to the power source control circuit to output power to allow each of the second functional control circuits selected to be monitored to return the monitoring signal.

11. The control device of claim 1, wherein
the mobile body is an automobile, and
the first functional control circuit controls a keyless entry function of the automobile.

12. The control device of claim 1, wherein the second functional control circuits are separate from the single chip on which the first functional control circuit and the power source control circuit are mounted.

13. The control device of claim 1, wherein a first second functional control circuit of the at least two second functional control circuits is a processing circuit that is configured to process information input from the plurality of sensors and output processed information to a second second functional control circuit of the at least two second functional control circuits.

14. The control device of claim 13, wherein
the circuitry further includes a communication circuit configured to transmit the control signals generated by the first functional control circuit and the second second functional control circuit to the onboard devices.

15. The control device of claim 14, wherein the communication circuit is mounted on the same chip where the first functional control circuit and the power source control circuit are mounted.

16. The control device of claim 1, wherein
the power source control circuit is configured to control the supply and cutoff of power to the second functional control circuits is based on a power supply table specifying, for each scene of the mobile body, a combination of the second functional control circuits to which power is to be supplied, the first functional control circuit is further configured to monitor whether the second functional control circuits are actuatable, and select one or more of the second functional control circuits to be monitored as a monitoring target based on the power supply table.

17. The control device of claim 16, wherein,
the first functional control circuit is further configured to output a monitoring signal to each of the second functional control circuits selected to be monitored.

18. The control device of claim 17, wherein, when supplied with power, each of the second functional control circuits is further configured to return the monitoring signal to the first functional control circuit.

19. The control device of claim 18, wherein the first functional control circuit is further configured to output a control signal to the power source control circuit to output power to allow each of the second functional control circuits selected to be monitored to return the monitoring signal.

* * * * *